United States Patent [19]

Combes et al.

[11] Patent Number: 5,352,640
[45] Date of Patent: Oct. 4, 1994

[54] COLORED GLASS COMPOSITIONS AND GLAZINGS PRODUCED THEREWITH

[75] Inventors: Pierre Combes, Vanves; Jean-Jacques Massol, Asnieres, both of France; Pedro C. Alvarez, Salinas, Spain

[73] Assignee: Saint-Gobain Vitrage International, Courbevoir, France

[21] Appl. No.: 44,554

[22] Filed: Apr. 7, 1993

Related U.S. Application Data

[63] Continuation of Ser. No. 682,497, Apr. 9, 1991, abandoned.

[30] Foreign Application Priority Data

Apr. 13, 1990 [FR] France .................. 90 04805

[51] Int. Cl.$^5$ .................. C03C 3/078; C03C 4/08
[52] U.S. Cl. .................. 501/71; 501/904; 501/905
[58] Field of Search .................. 501/70, 71, 904, 905, 501/14

[56] References Cited

U.S. PATENT DOCUMENTS

| | | | |
|---|---|---|---|
| 2,524,719 | 10/1950 | Tillyer | 501/71 |
| 4,104,076 | 8/1978 | Pons | 106/52 |
| 4,500,567 | 2/1985 | Kato et al. | 427/255.3 |
| 4,525,462 | 6/1985 | Behr | 501/71 |
| 4,873,206 | 10/1989 | Jones | 501/71 |

FOREIGN PATENT DOCUMENTS 803927 11/1958 United Kingdom .
1512704 6/1978 United Kingdom .

OTHER PUBLICATIONS

Chemical Abstracts, vol. 98, No. 2, Jan. 10, 1983, No. 7450D, p. 177.
Chemical Abstracts, vol. 88, No. 24, Jun. 12, 1978, No. 175980P, p. 356.
Chemical Abstracts, vol. 107, No. 18, Nov. 2, 1987, No. 160079P, p. 371.

*Primary Examiner*—Karl Group
*Attorney, Agent, or Firm*—Pennie & Edmonds

[57] ABSTRACT

The invention relates to a colored glass composition for producing glazings for use, e.g., as automobile sunroofs. The colored glass according to the invention is a soda-lime-silica glass comprising, as coloring agents, 1.4 to 4% iron oxide expressed as $Fe_2O_3$ and 0 to 0.05% cobalt oxide, with the cobalt oxide exceeding about 0.02% when the $Fe_2O_3$ is below about 2% and, optionally, selenium and chromium oxide, whereby the sum of the $CoO+Se+Cr_2O_3$ is preferably less than about 0.24% by weight. The glass of the invention has a total light transmission factor under illuminant A equal to or below approximately 20% and a total energy transmission factor equal to or below approximately 12% for a thickness of 3.85 mm.

14 Claims, No Drawings

COLORED GLASS COMPOSITIONS AND GLAZINGS PRODUCED THEREWITH

This is a continuation of application Ser. No. 07/682,497, filed Apr. 9, 1991, now abandoned.

FIELD OF THE INVENTION

The present invention relates to glass compositions used in the production of colored glazings, particularly for motor vehicle sunroofs.

BACKGROUND OF THE INVENTION

Now, more than ever before, automobile designers are incorporating into their designs glazings formed of colored glass which have both a functional purpose and an attractive appearance. This tendency is confirmed by the ever increasing glazed surface of new automobile models compared with older types.

As a result, the greenhouse effect is an important factor which must be taken into account in determining the air conditioning requirements for such automobiles. This is more particularly true in the case of cars equipped with glass sunroofs. In an attempt to reduce this greenhouse effect, numerous unsuccessful attempts have previously been made by those skilled in the art to produce colored glass compositions having the low light and energy transmission properties offered by the glasses of the present invention.

SUMMARY OF THE INVENTION

The present invention is directed to glass compositions which are highly colored, particularly grey-blue or green glasses, which are suitable for the applications described above. For a given thickness, these glasses have a very low total light transmission and total energy transmission.

According to the invention, these attributes are obtained with the use of a colored glass formulation comprising the following constituents in the weight proportions defined by the following limits:

| | |
|---|---|
| $SiO_2$ | 64 to 75% |
| $Al_2O_3$ | 0 to 5% |
| $B_2O_3$ | 0 to 5% |
| CaO | 5 to 15% |
| MgO | 0 to 5% |
| $Na_2O$ | 10 to 18% |
| $K_2O$ | 0 to 5% | wherein the total amount of the alkaline earth oxides ranges between 6 and 16% by weight and further wherein the total amount of alkali metal oxides is between 10 and 20% by weight. At least one of $Al_2O_3$, $B_2O_3$, MgO or $K_2O$, each in an amount of up to 5% (0.05) by weight, therefore may be employed. The glass compositions of the invention also incorporate, as coloring agents:

| | |
|---|---|
| $Fe_2O_3$ (total iron) | 1.4 to 4% |
| CoO | 0 to 0.05%. |

The amount of CoO is preferably greater than about 0.02% by weight when the amount of $Fe_2O_3$ is less than about 2% by weight. Optionally, selenium and/or chromium oxide may also be added to the glass composition to provide additional coloration. The sum of CoO+selenium+$Cr_2O_3$ is preferably no greater than 0.24. The glass of the invention has a total light transmission factor under illuminant A (i.e., designated as "$TL_A$") less than or equal to about 20% and a total energy transmission factor (i.e., "$T_E$") equal to or below approximately 12% at a "standard" glass thickness of 3.85 mm.

DETAILED DESCRIPTION OF THE PREFERRED EMBODIMENTS

Glazings formed with the glasses produced according to the invention are produced under conditions such that their redox potential, i.e., defined as the ratio of the ferrous oxide to the total quantity of iron, both expressed in the form of ferric oxide, ranges between about 0.16 and 0.40. Most of the glasses according to the invention, i.e., at least those having an iron content equal to or above approximately 2%, are produced in electric furnaces. The remaining compositions are compatible with conventional reverberatory furnaces.

For a given thickness, the colored glasses according to the invention preferably have a total light transmission below about 15%, or more preferably below 12%. The total energy transmission of these glasses is generally below about 8%.

In order to obtain the desired optical characteristics, particularly the aforementioned light and energy transmission values, the percentage of the coloring agents in the glass is adjusted, depending upon the thickness of the glass.

Thus, for a thickness of 3.85 millimeters, the colored glasses formed according to the invention can incorporate iron oxide as the sole coloring agent when the total content of this material, expressed as $Fe_2O_3$, is greater than about 3%. For such glasses, the production conditions are controlled in a manner known to those in the art such that their redox potential remains preferably equal to or below 0.30. The dominant wavelength of the glass thus obtained, when illuminated under illuminant C, is between about 500 and 570 nanometers.

For the same thickness, colored glasses produced according to the invention having a total iron oxide content (expressed as $Fe_2O_3$) equal to or below about 3%, may further comprise cobalt oxide as an additional coloring agent.

Thus, in one embodiment of the invention, the colored glass comprises between about 2 and 3% $Fe_2O_3$, approximately 140 to 400 ppm of CoO and optionally up to 50 ppm of selenium.

In general, such glasses have a dominant wavelength under illuminant C of between about 485 and 505 nm. Their total energy transmission factor is equal to or below approximately 10% and is generally between 4 and 6.5%. The excitation purity of these glasses under illuminant C is generally below about 30%. The glasses of the invention, which have a particularly low total light transmission factor, can have a relatively high excitation purity without having an excessively detrimental action on the visual perception of the color neutrality of the glass.

In a further embodiment of the invention, the glass compositions may optionally have a lower content of cobalt oxide and selenium in accordance with the following weight proportions:

| | |
|---|---|
| $Fe_2O_3$ | 1.4 to 2.5% |
| CoO | 150 to 330 ppm |

-continued

| | |
|---|---|
| selenium | 10 to 35 ppm |

When illuminated under illuminant C, these glasses have a dominant wavelength between about 485 and 570 nm and their excitation purity is generally below 20%. Their total energy transmission factor is below 10% and is usually between 5 and 8%. Glasses with a dominant wavelength between 485 and 500 nm are preferred for aesthetic reasons.

For a thickness of 3.85 mm the colored glasses formed according to the invention with a total iron oxide content, expressed as $Fe_2O_3$, equal to or below about 2.5%, can incorporate cobalt oxide and chromium oxide.

Thus, in another embodiment of the invention, the colored glass may comprise between about 1.5 and 2.5% $Fe_2O_3$, between about 150 and 300 ppm of cobalt oxide and between 700 and 2000 ppm of chromium oxide. When illuminated under illuminant C, these glasses have a dominant wavelength between about 490 and 510 nm and an excitation purity of about 10 to 25%. Their total energy transmission factor is below 10% and in general between about 5 and 8%.

To form the glasses according to the invention, the basic composition used is conventional in the float glass industry. Coloring agents are added to the composition in sufficient proportions to make it possible, for a given thickness, to obtain the desired optical characteristics and appearance. The basic glass has the following formulation (in percent by weight):

| | |
|---|---|
| $SiO_2$ | 72.1% |
| $Al_2O_3$ | 0.74% |
| CaO | 8.90% |
| MgO | 3.79% |
| $Na_2O$ | 14.16% |
| $K_2O$ | 0.11% |
| $SO_3$ | 0.20% |

The coloring agents are added to the glass in place of a portion of the silica.

The various examples appearing in Tables I and II set forth below illustrate different combinations of coloring agents. The values for the optical characteristics indicated were measured on 3.85 mm thick glazings. These glasses were formed under conditions such that they have a redox potential preferably equal to or below 0.35.

For glasses containing iron and cobalt oxide as coloring agents and having between approximately 2 and 3% of iron, it is desirable to include at least about 140 ppm of CoO within a 3.85 mm thick glazing. At lower amounts of CoO, the light transmission of the glass tends to increase and can exceed 15%.

For glasses colored with selenium and iron and cobalt oxides, it is recommended to introduce at least 1.4% iron oxide for a 3.85 mm thick glazing. Below this percentage, the light and energy transmissions of the glass respectively exceed 15 and 12%.

The glass compositions set forth in Tables I and II below and the preceding remarks concerning certain combinations of coloring agents are provided only to illustrate the numerous variations which can be produced without passing outside the scope of the invention and are not meant to limit the invention in any manner.

The glass formulations of the invention are compatible for use with standard prior art procedures for producing float glass, provided that certain glasses, i.e., those having an iron content greater than or equal to about 2%, are produced in electrical furnaces. The thickness of the ribbon of glass obtained in the float glass process, e.g., by layering the molten glass on a tin bath, can vary between 2 and 10 mm and preferably between 3 and 6 mm, where the glass is intended for the production of a glazing for a sunroof.

Glazings obtained by cutting a ribbon of colored glass formed according to the present invention, optionally followed by bending to a desired shape, may be used directly for producing a sunroof for a car in such a way as to reconcile the aesthetic requirements with the requirements concerning passenger comfort.

As known in the art, such glazings may initially be surface treated or they may be combined with, e.g., a sheet of uncolored glass, an organic coating such as a polyurethane-based film with anti-lacerating properties, or a film ensuring a tight seal in the case of breakage. These glazings may also be locally coated with, e.g., an enamel coating.

Furthermore, glazings formed according to the invention can additionally be coated with at least one metal oxide layer such as tin oxide, obtained by a high temperature chemical deposition technique such as pyrolysis, e.g. in accordance with the process described in U.S. Pat. No. 4,500,567, which discloses thermally decomposing an organic tin compound, the disclosure of which is incorporated herein by reference or chemical vapor deposition (CVD) or by vacuum deposition, which processes are well known in the art. In the case of a glazing for use in forming the sunroof of a car, the metal oxide coating makes it possible to further improve the light and energy transmission properties of the glass.

TABLE I

| Glass composition no. | Coloring Agents (% by weight) | | | | |
|---|---|---|---|---|---|
| | $Fe_2O_3$ | CoO | Se | $Cr_2O_3$ | Fe(II)/Total Fe |
| 1 | 3.72 | — | — | — | 0.26 |
| 2 | 1.45 | 0.0280 | 0.0024 | — | 0.35 |
| 3 | 1.54 | 0.0234 | 0.0026 | — | 0.34 |
| 4 | 1.59 | 0.0245 | 0.0031 | — | 0.35 |
| 5 | 1.58 | 0.0234 | 0.0023 | — | 0.39 |
| 6 | 1.76 | 0.0300 | 0.0023 | — | 0.33 |
| 7 | 1.74 | 0.0290 | 0.0019 | — | 0.34 |
| 8 | 2.27 | 0.0310 | 0.0015 | — | 0.34 |
| 9 | 2.85 | 0.0272 | — | — | 0.31 |
| 10 | 2.81 | 0.0160 | — | — | 0.26 |
| 11 | 2.80 | 0.0203 | — | — | 0.35 |
| 12 | 2.91 | 0.0270 | — | — | 0.27 |
| 13 | 2.36 | 0.0250 | — | 0.15 | 0.30 |

TABLE II

| Glass composition no. | Optical Characteristics | | | |
|---|---|---|---|---|
| | $TL_A$ (%) | TE (%) | $\lambda$ (nm) | $P_o$ (%) |
| 1 | 11.3 | 4.5 | 566 | 43.7 |
| 2 | 11.7 | 8.4 | 485 | 14.7 |
| 3 | 9.8 | 6.5 | 551 | 7.2 |
| 4 | 10.1 | 7.1 | 565 | 11.6 |
| 5 | 11.7 | 7.2 | 493 | 8.3 |
| 6 | 9.3 | 6.4 | 489 | 12.3 |
| 7 | 11.1 | 7.5 | 485 | 19.3 |
| 8 | 7.8 | 4.5 | 488 | 20.3 |
| 9 | 8.2 | 4.2 | 489 | 25.7 |
| 10 | 13.5 | 6.3 | 502 | 10.8 |
| 11 | 9.7 | 4.5 | 494 | 17.3 |
| 12 | 10.2 | 5.4 | 490 | 22.4 |

TABLE II-continued

| Glass composition no. | Optical Characteristics | | | |
|---|---|---|---|---|
| | $TL_A$ (%) | TE (%) | λ (nm) | $P_o$ (%) |
| 13 | 11.1 | 7.0 | 500 | 18.2 |

We claim:

1. A glass composition for forming colored glazings consisting essentially of, in percent by weight, 64 to 75% $SiO_2$, 5 to 15% CaO, 10 to 18% $Na_2O$, at least one of $Al_2O_3$, $B_2O_3$, MgO or $K_2O$, each in an amount of up to 5% by weight and CoO as a coloring agent in an amount of up to 0.05% by weight, wherein the amount of CoO is greater than about 0.02% by weight when $Fe_2O_3$ is present in said composition in an amount less than 2% by weight, and selenium in an amount up to about 0.005%, and as a coloring agent, 1.4 to 4% $Fe_2O_3$, wherein the amount of alkaline earth oxides is between about 6–16% by weight and the amount of alkali metal oxides is between about 10–20% by weight and wherein glazings formed of said composition when illuminated under Illuminant C, has a dominant percentage light transmission between about 485–570 nm, and which have a total light transmission factor under illuminant A of less than 20% and a total energy transmission factor of less than 12% when said glazings have a thickness of about 3.85 mm.

2. The composition of claim 1 which further comprises a color effective amount of chromium oxide as an additional coloring agent, wherein the total amount of CoO, selenium and $Cr_2O_3$ is less than about 0.24% by weight of said composition.

3. The composition of claim 2 which consists essentially of 2 to 3% by weight $Fe_2O_3$, 0.014 to 0.04 percent by weight CoO and up to 0.005% by weight selenium.

4. The composition of claim 2 which consists essentially of 1.4 to 2.5% by weight $Fe_2O_3$, 0.015 to 0.003% by weight CoO and 0.0010 to 0.0035% by weight selenium.

5. The composition of claim 2 which consists essentially of 1.5 to 2.5% by weight $Fe_2O_3$, 0.015 to 0.030% by weight CoO and 0.07 to 0.2% by weight $Cr_2O_3$ 6. The composition of claim 1 wherein said $Fe_2O_3$ comprises between about 16 to 40% by weight of FeO.

7. The composition of claim 6 wherein said $Fe_2O_3$ is present in said composition in an amount between about 3–4% by weight.

8. A glazing comprising at least one colored glass sheet having the composition of claim 3.

9. A glazing comprising at least one colored glass sheet having the composition of claim 4.

10. A glazing comprising at least one colored glass sheet having the composition of claim 5.

11. A glazing comprising at least one colored glass sheet having the composition of claim 8.

12. The glazing of claim 8, 9, 10 or 11 wherein the thickness of said glazing is between about 2 and 10 millimeters.

13. The glazing of claim 12 wherein the thickness of said glazing is between about 3 and 6 millimeters.

14. The glazing of claim 13 which further comprises at least one metal oxide layer coated upon at least a portion of said glazing.

* * * * *